United States Patent [19]
Emerson

[11] 3,754,582
[45] Aug. 28, 1973

[54] TREE FELLING DEVICE
[76] Inventor: Christopher P. Emerson, Lamoni, Iowa
[22] Filed: Oct. 12, 1971
[21] Appl. No.: 188,277

[52] U.S. Cl. ........................ 144/34 F, 144/309 AC
[51] Int. Cl. .......................................... A01g 23/08
[58] Field of Search ............... 144/3 R, 34, 309 AC, 144/2 J

[56] References Cited
UNITED STATES PATENTS
2,657,904  11/1953  Evenson ..................... 144/34 A UX Primary Examiner—Andrew R. Juhasz
Assistant Examiner—W. D. Bray
Attorney—Henderson & Strom

[57] ABSTRACT

A tree-felling device having a pair of shims adapted to be inserted in a saw cut in a tree trunk and spread by a wedge inserted between the shims. The wedge is actuated by a jacking means to which chains attached to the shims are fastened such that actuation of the jacking means causes the wedge to enter the saw cut between the shims, thereby felling the tree.

6 Claims, 5 Drawing Figures

PATENTED AUG 28 1973 3,754,582

3,754,582

TREE FELLING DEVICE

BACKGROUND OF THE INVENTION

This invention relates to the felling of trees, and more particularly to a device for felling a tree in a desired direction.

It is a common practice in modern timber operations to utilize some sort of device for felling trees in a selected or predetermined direction. This is sometimes due to the fact that the trees must fall in a particular direction to avoid damaging other trees or to avoid being caught on other trees such that the cut tree does not fall to the ground. Also, in certain areas the tree must be felled in a particular direction in order to have access to the cut tree for transportation purposes.

In cutting timber, a problem often arises during a sawing operation of the tree binding the saw due to wind or other factors causing the tree to settle back and bind the saw.

Numerous devices have been proposed for alleviating these problems. For example, a jacking device is described in U.S. Pat. No. 3,548,899 which was proved quite satisfactory under certain conditions. Hydraulic wedge devices are described in U.S. Pat. Nos. 2,657,904 and 2,690,323 for use in felling heavy trees. However, these hydraulic wedge devices have not found acceptance in the industry for various reasons. The oldest, and still one of the most widely used, method of felling trees involves hammering a wedge into a saw cut to urge the tree over in a desired direction. This particular method is subject to obvious limitations.

Prior to this invention, a need long existed for a simple, efficient device for felling trees in a desired direction.

SUMMARY OF THE INVENTION

According to this invention, a tree felling device is provided which is small enough to be carried and operated by an individual person. The device of this invention does not require any special training or technique for its operation. The present invention can be utilized after a conventional saw cut or kerf has been cut into a tree which is to be felled. Normally, a wedge shaped notch is also cut in the tree trunk opposite the saw cut to allow the tree to be felled.

In accordance with this invention, a pair of thin shim members are inserted into the saw cut, and a wedge attached to a jacking means such as a hydraulic jack is inserted between the pair of shims. The jacking means is then attached, such as by chains, to the shims such that operation of the jacking means will cause the wedge to be moved between the pair of shims, thereby urging the tree over in a desired direction.

The device of this invention is extremely simple, and can be operated in the field by relatively untrained persons. Also, this device is very rugged and maintenance free, which is essential for operations in remote areas.

Accordingly, it is an object of this invention to provide an improved device for felling trees.

It is a further object to provide a tree felling device which is rugged, effective, easy to operate and maintain, and which can be used by a single person.

DESCRIPTION OF THE PREFERRED EMBODIMENT

Figures 1, 2:
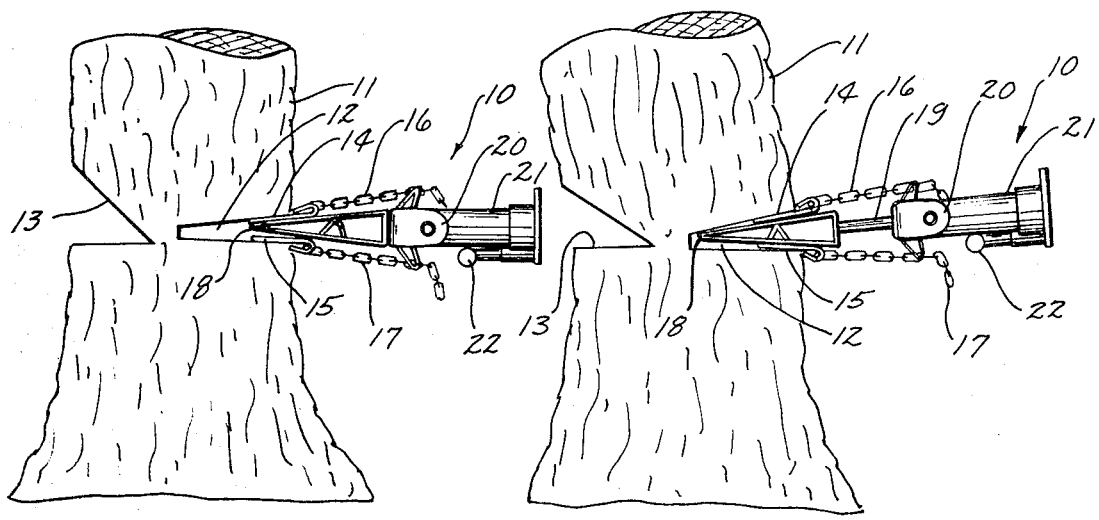
FIG. 1 is a side elevation showing the device of the invention during the initial stage of a tree felling operation.
FIG. 2 is a side elevation showing the device of the invention during a later stage of a tree felling operation.

The preferred embodiment of the invention is illustrated in detail in the drawings, and the device and its operation will now be described by reference thereto.

As shown in FIG. 1, a tree felling device is indicated generally at 10. A tree trunk 11 is shown having a saw cut 12 and an undercut notch 13 formed opposite thereto. A pair of flat, preferably metal, shims 14 and 15 are shown inserted in the cut 12 in a face-to-face relationship. The shims 14 and 15 are attached to one end of chains 16 and 17, and the other ends of chains 16 and 17 are attached to a jack 20. The jack 20 includes a cylinder 21 and an operating handle 22 for effecting movement of a piston 19. A wedge 18 is attached to the end of piston 19 and moves away from the jack 20 during operation of the jack to extend the piston 19. The wedge 18 is shown inserted between the near ends of the pair of shims 14 and 15.

It can be seen that as the jack 20 is operated to extend the piston 19 and wedge 18 connected thereto, the wedge 18 will be forced into the saw cut 12 between the shims 14 and 15 due to the fact that the shims 14 and 15 are held relative to the jack 20 by chains 16 and 17.

Referring now to FIG. 2, the wedge 18 is shown inserted deep into the saw cut 12 with a resultant spreading of the saw cut and tilting of the tree trunk 11. The force acting on the tree trunk 11 is ideally applied at the outer edge of the saw cut 12 to obtain maximum leverage in tilting the tree trunk.

Figures 3, 4:
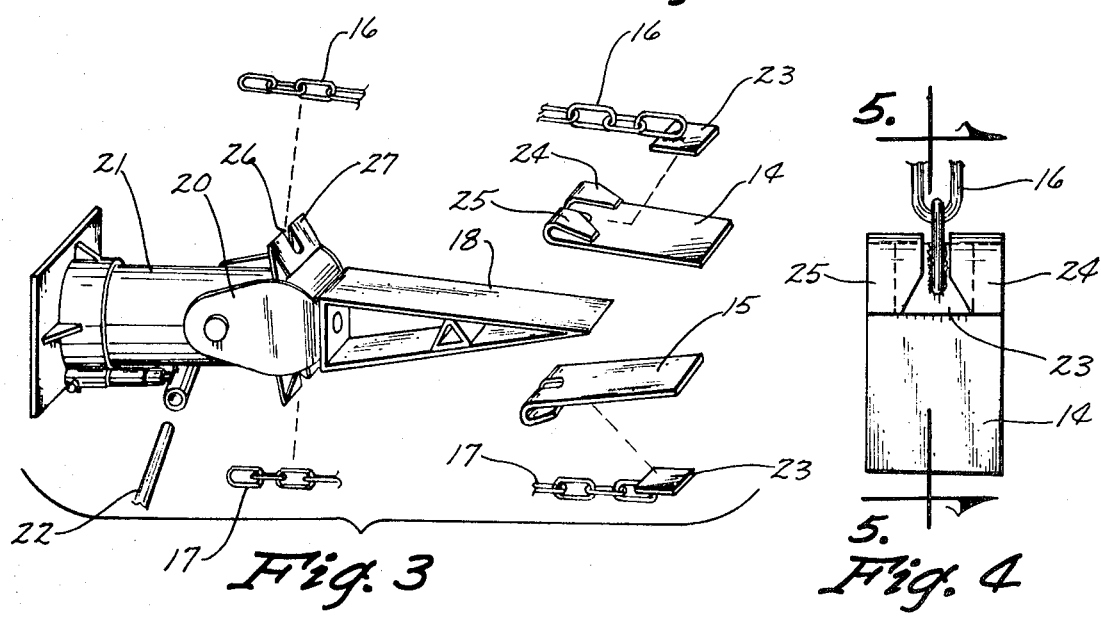
FIG. 3 is an exploded view in perspective showing the relationship of the parts of the device.
FIG. 4 is a top plan view of a shim and the means for connecting it to a chain.
Figure 5:
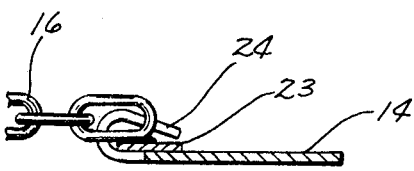
FIG. 5 is a cross sectional view taken along the lines 5—5 of FIG. 4.

The details of the various parts of the device according to this preferred embodiment of the invention are illustrated in FIG. 3. The shims 14 and 15, which normally are identical, include a flat thin section adapted for insertion in a saw cut and a means for attaching a chain to the shim. As shown in FIG. 3, the chains 16 and 17 include a small square chain attachment plate 23 on one end, and the element 23 is adapted for removable insertion in an opening formed by folding over shim slot ends 24 and 25 after cutting a V-shaped opening in the unfolded shims.

The jack 20 includes plates 27 attached to the jack body, and the plates 27 have chain attaching slots 26 formed therein. The chains can be fastened to the jack anywhere along their length by placing any link of the chain in slot 26.

The chains 16 and 17 can be permanently attached to either the shims, the jack, or both. However, a more flexible tool is provided by having the chains adjustably attached to the jack, and the removable attachment to the shims allows the operator to handle and position the shims without handling the chains at the same time.

The device of this invention, rather surprisingly, does not have to be anchored or held relative to the tree being felled. While a chain or cable could be looped around the tree and fastened at both ends to the jack, such is not necessary, as the frictional force acting between the shims and the tree trunk has been found to be sufficient to prevent withdrawal of the shims during operation of the jack.

The preferred jack for this invention is a hydraulic, manually operated device such as a heavy-duty automobile jack modified by having a wedge affixed to its piston. Other types of jacking means, such as mechanical jacks or motor powered jacks could obviously be used in a similar manner if the conditions of use dictated such other types.

The device of this invention applies the force smoothly and uniformly, as opposed to the use of a hammered wedge. The hammering of a wedge is unsatisfactory in most cases because the wedge just cuts into the wood with each hammer blow. Preferably, the wedge 18 has a small angle, such as about 20°, in order to provide optimum leverage to the operation. The angle must be sufficiently large, however, to tilt the tree trunk before it has entered all the way into the saw cut. The optimum angle for particular conditions is easily determined.

The device of this invention provides several advantages compared to the hydraulic wedge devices described in the earlier mentioned U.S. Pat. Nos. 2,657,904 and 2,690,323. In addition to the obvious complexity and expense of these prior art wedges, they require a notch to be cut enlarging the saw cut before they can be inserted. The biggest disadvantage of a device such as is illustrated in U.S. Pat. No. 2,690,323 is, as seen in FIGS. 3 and 4 thereof, the fact that the bulk of the pressure exerted on the tree trunk is applied in the deepest interior of the trunk, which reduces the effectiveness of the force as compared to the present invention. Specifically, it is apparent that the tips of the split jaws of U.S. Pat. No. 2,690,323 move much farther than the portions of the jaws near the hinges. Thus, that device would spread the tree by force applied near the center of the trunk, which is the least efficient point.

According to this invention, the shims 14 and 15 can be inserted in a saw cut 12 without any supplemental widening of the cut. The front tip of the wedge 18 is then inserted between the shims, the chains 16 and 17 attached to the shims and the jack 20, and the wedge 18 is driven into the saw cut by the thrust of the jack, resulting in a powerful splitting stress being applied to the tree trunk. The highly leveraged force tilts the tree trunk until the tree falls of its own weight.

It is possible to utilize a device according to this invention using only one shim, but the use of a pair of shims is much preferred.

In operating the preferred embodiment of the invention, if the jack is fully extended and the tree has not yet fallen, the jack can be released so that cylinder 21 can be moved toward the wedge 18, the chains 16 and 17 can be removed from the jack and reattached closer to the shims, effectively shortening the chains and allowing repeated action of the jack to drive the wedge 18 farther into the tree, limited only by the depth of the saw cut 12.

The preferred embodiment of the application described above provides a tree felling device which is simple, effective, maintenance-free, and can be used easily by one person. It will be apparent that numerous modifications and variations could be made in the specific device described herein without departing from the true scope of the invention, which is defined by the appended claims.

I claim:

1. A tree-felling device including:
   shim means adapted for insertion in a saw cut in a tree;
   jacking means including wedge means extendible therefrom; and
   chain means for connecting said shim means to said jacking means such that operation of the jacking means, when the wedge means is located for sliding engagement with the shim means, will cause the wedge means to slide along a surface of the shim means.

2. The tree-felling device of claim 1 wherein the shim means includes a pair of thin flat pieces having smooth inner surfaces.

3. The tree-felling device of claim 1 wherein the shim means is detachably connected to the means for connecting the shim means to the jacking means.

4. The tree-felling device of claim 1 wherein the jacking means is hydraulically actuated.

5. The tree-felling device of claim 4 wherein the shim means is a pair of thin, flat elements adapted to receive the wedge means between mating surfaces thereof.

6. The tree-felling device of claim 5 wherein each of the pair of thin, flat elements is detachably connected to a chain, and each chain is adjustably attached to the jacking means.

* * * * *